E. HEDENSKOOG.
MACHINE FOR SETTING PINS ON BOWLING ALLEYS.
APPLICATION FILED OCT. 28, 1914.
1,190,651. Patented July 11, 1916.
9 SHEETS—SHEET 1.
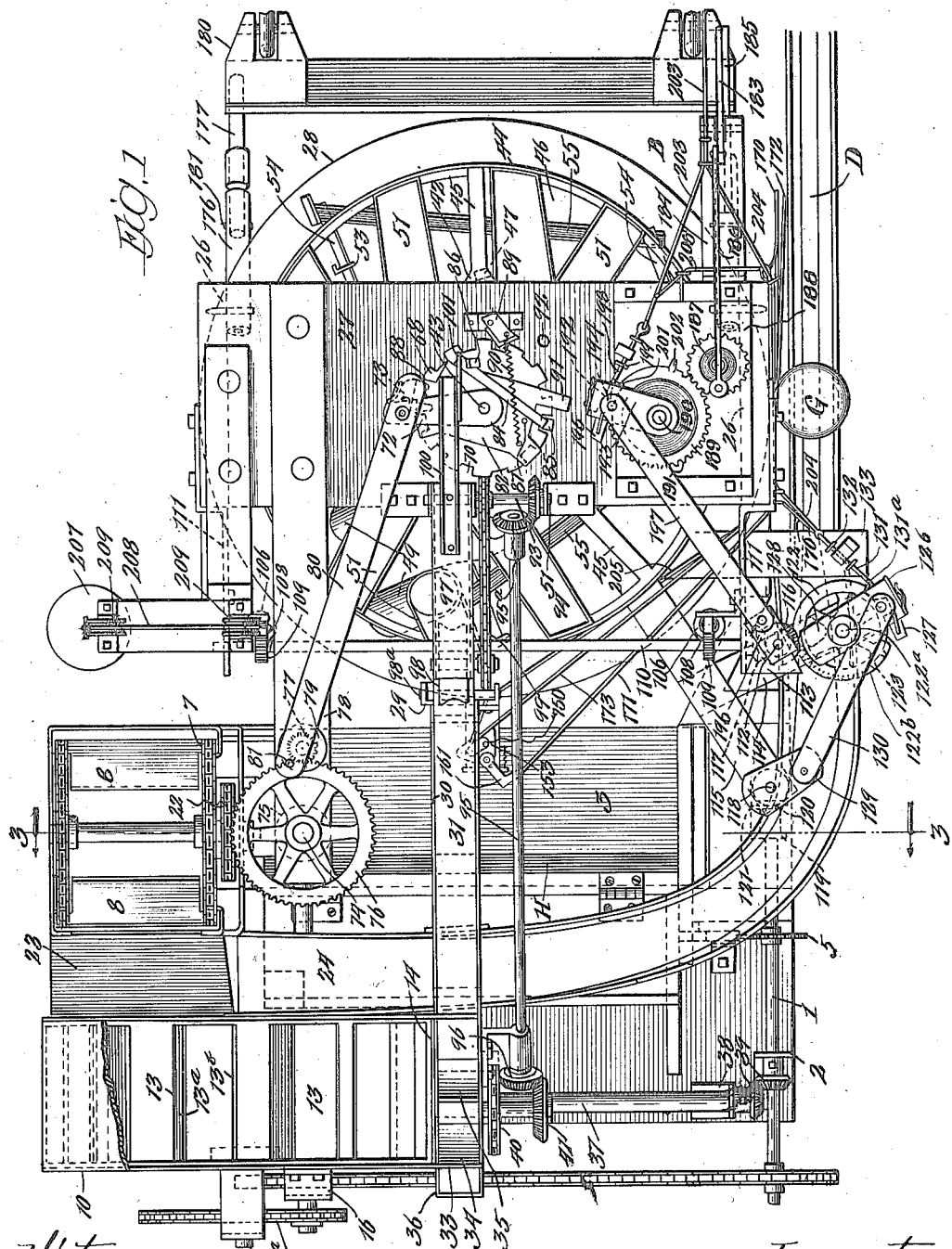
Witnesses:
Ernest H. Merchant
M. A. Kiddie
Inventor
Ernest Hedenskoog
By [signature] Atty

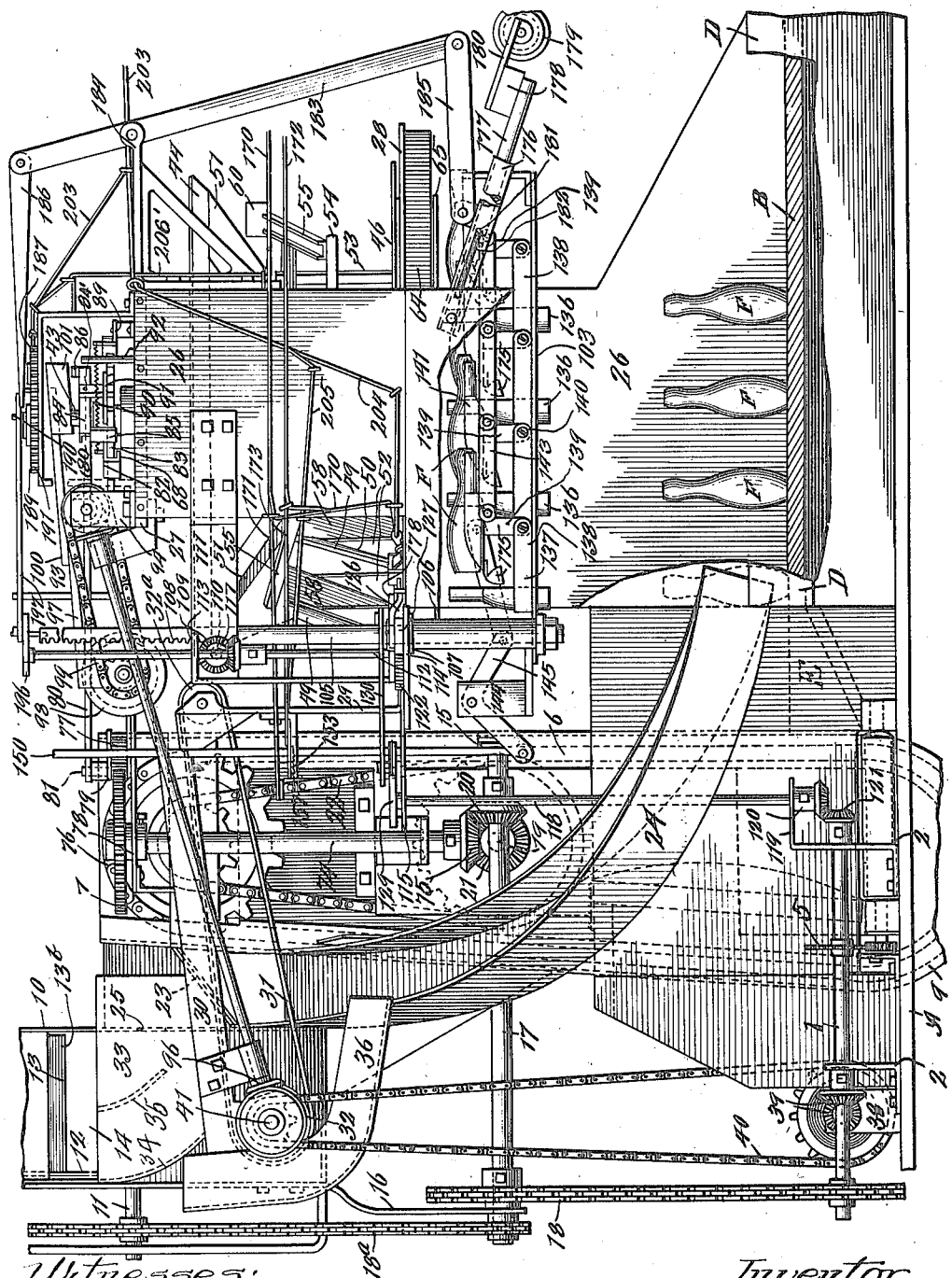

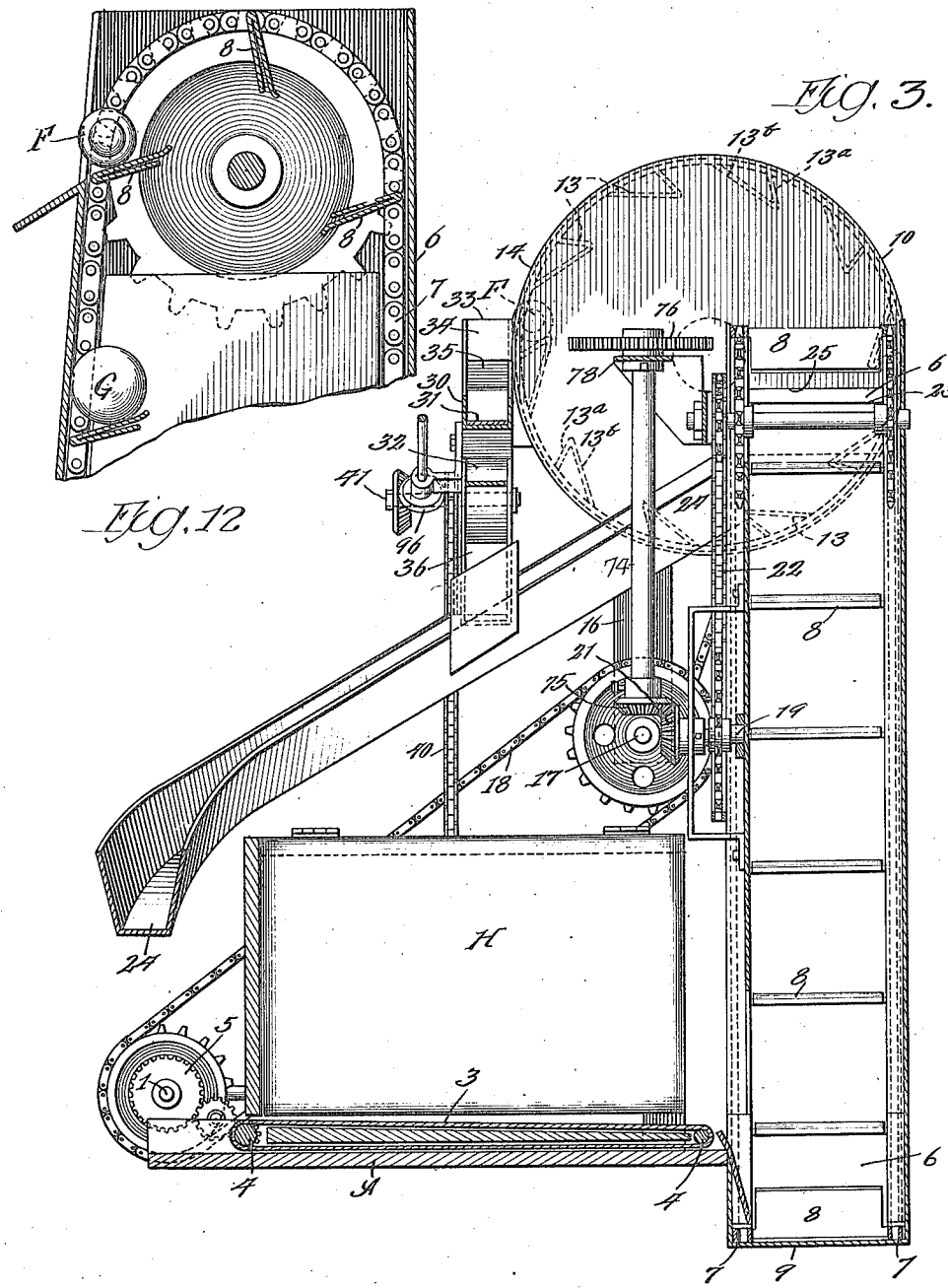

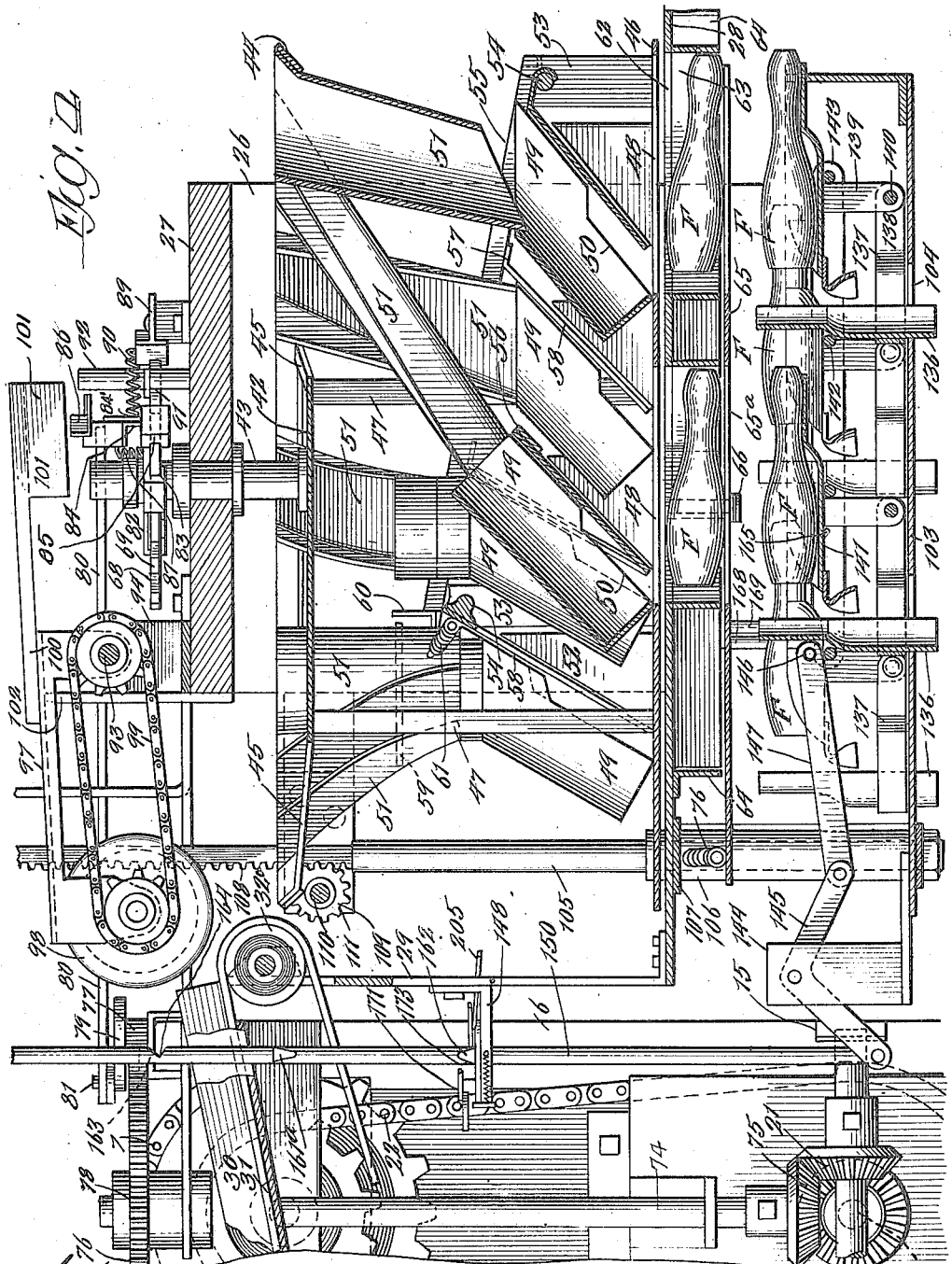

E. HEDENSKOOG.
MACHINE FOR SETTING PINS ON BOWLING ALLEYS.
APPLICATION FILED OCT. 28, 1914.
1,190,651.
Patented July 11, 1916.
9 SHEETS—SHEET 5.
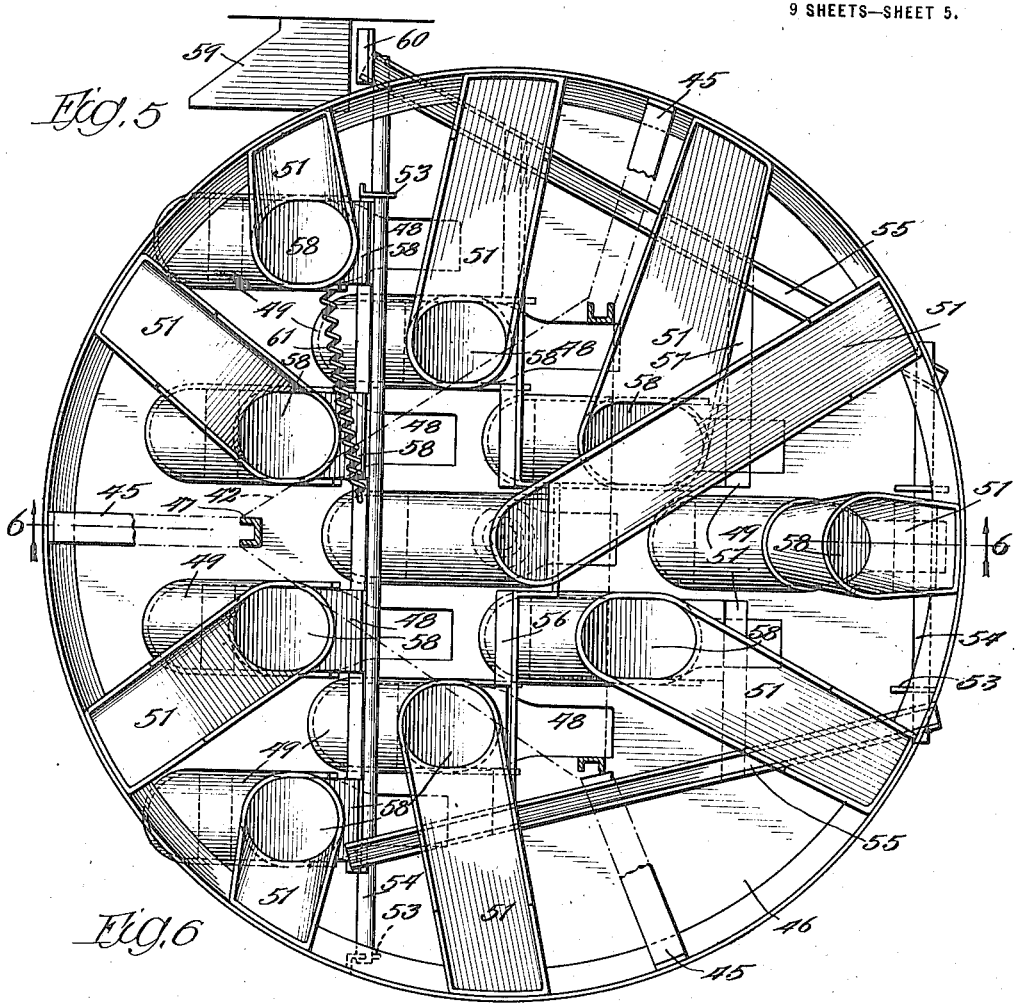
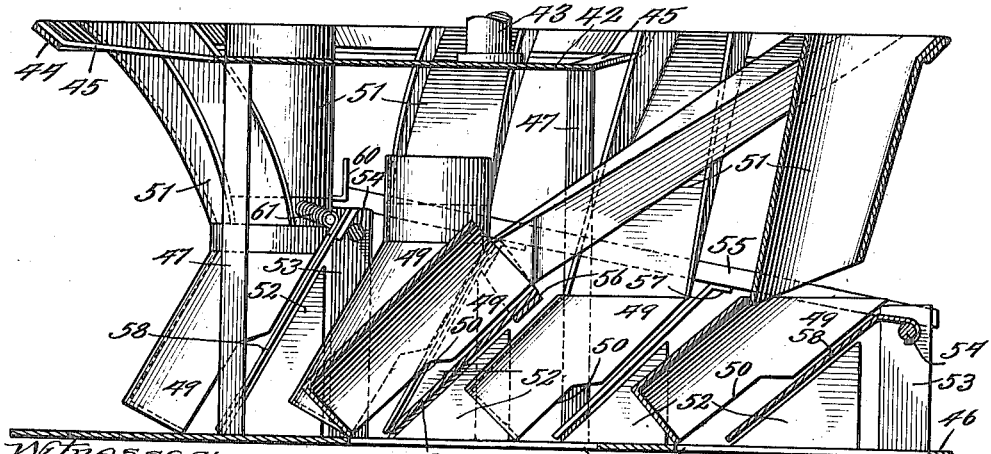

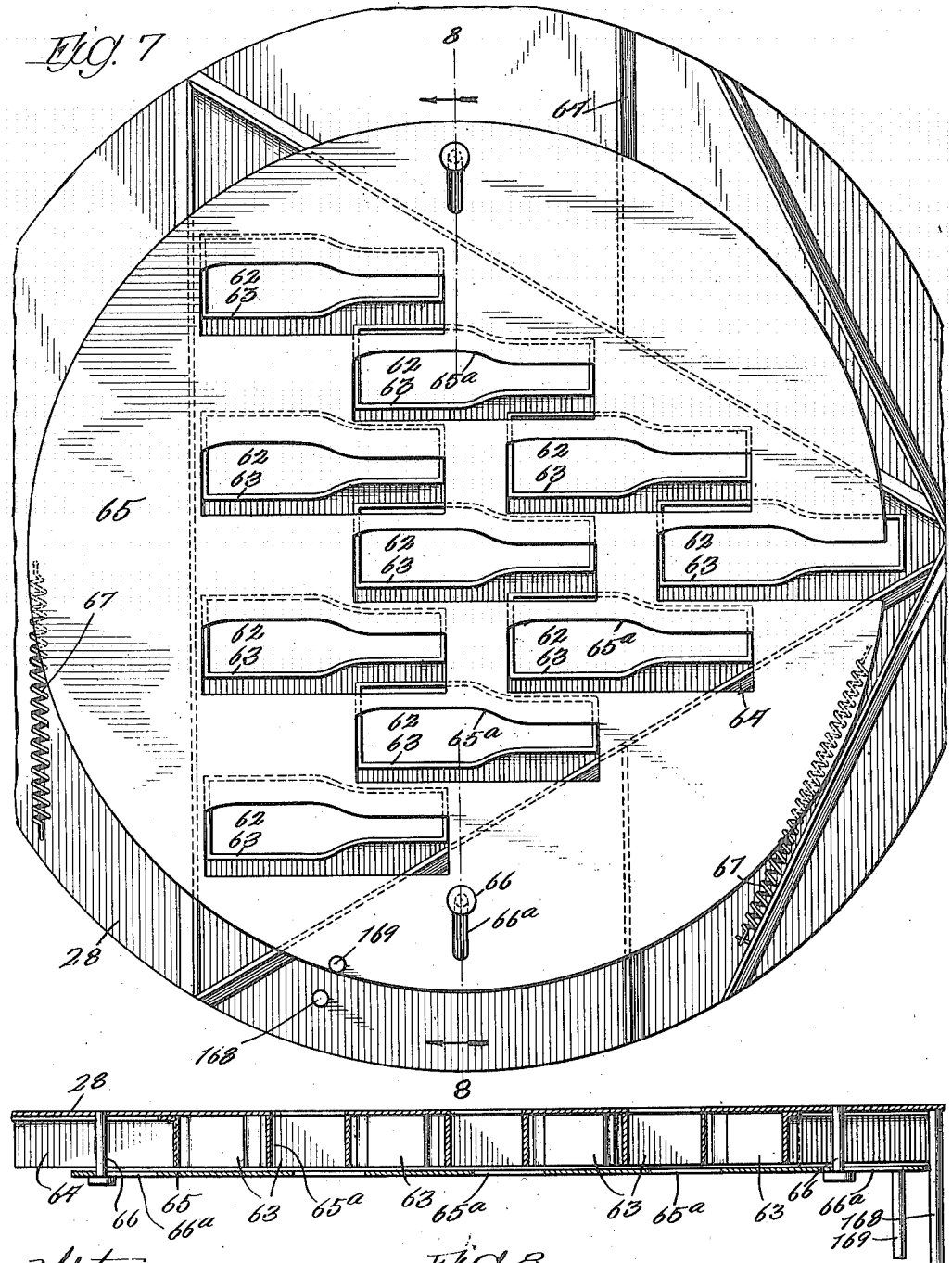

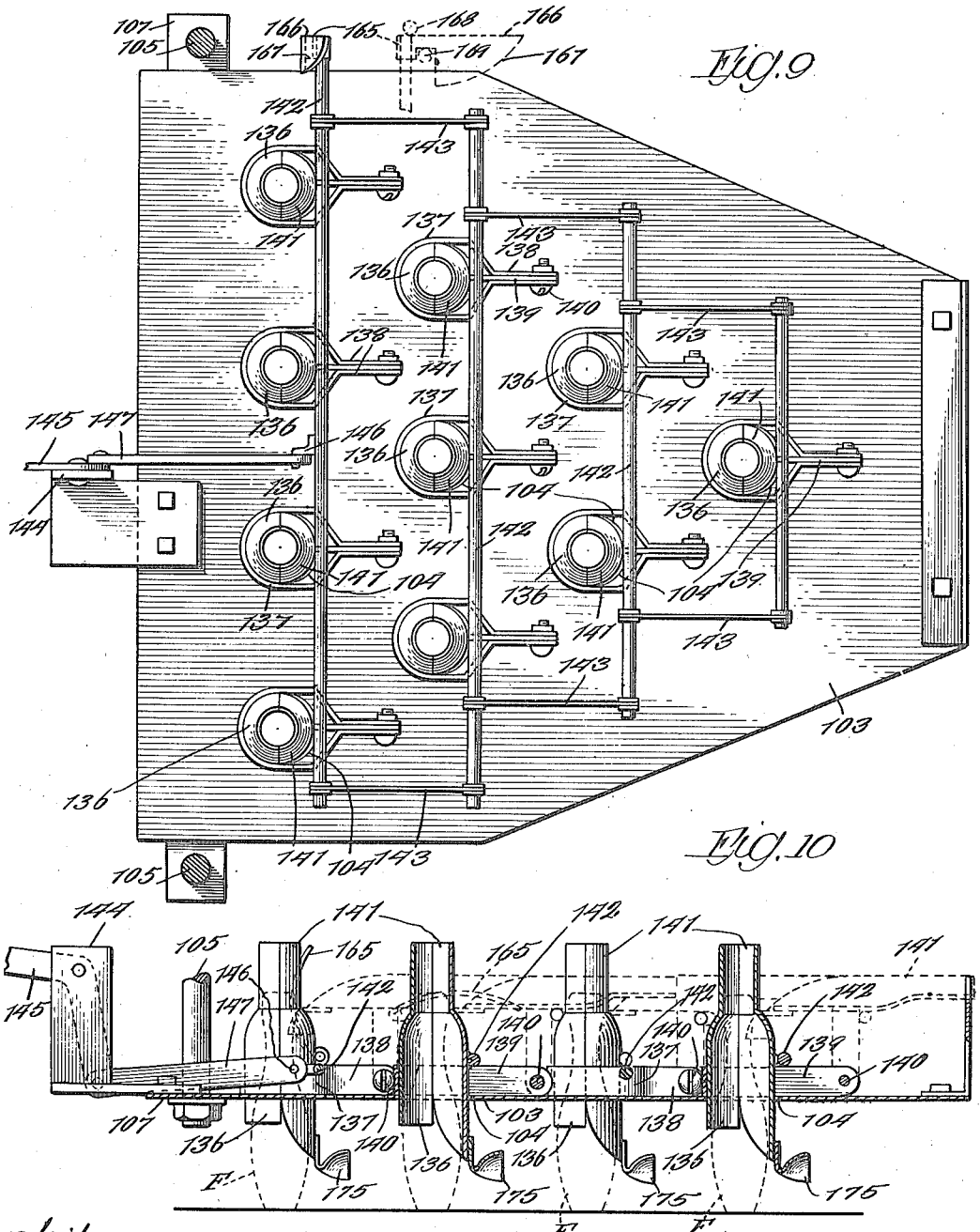

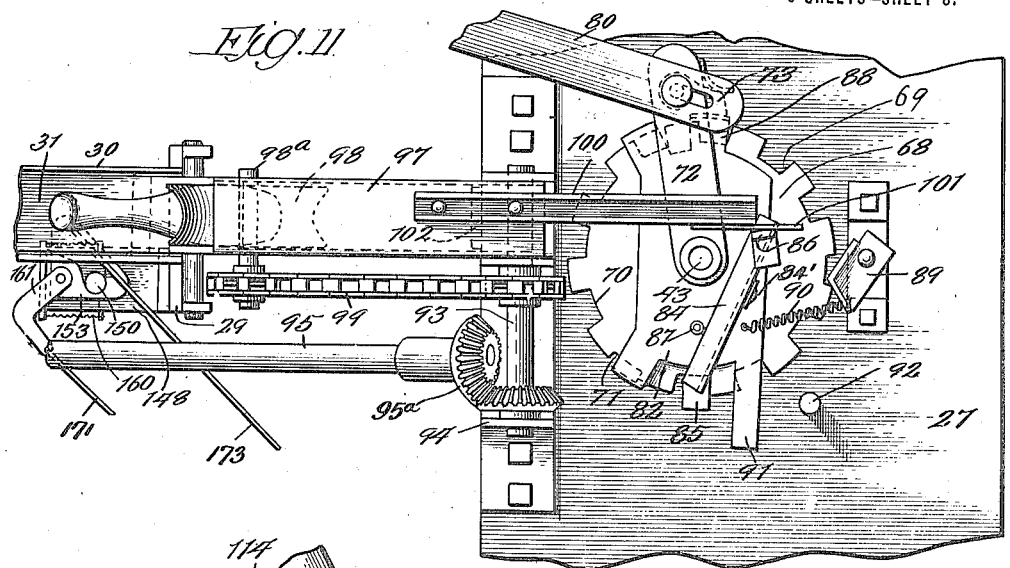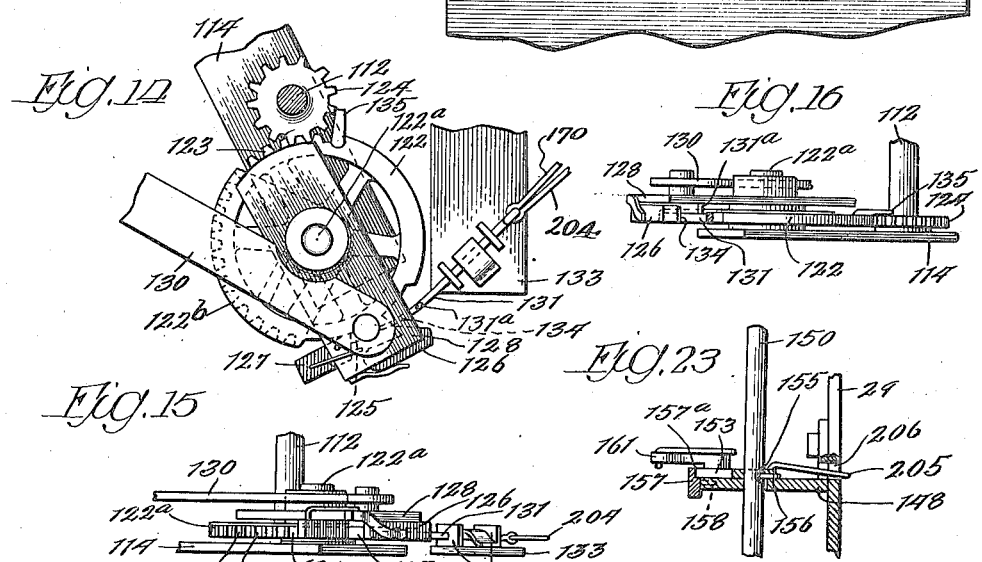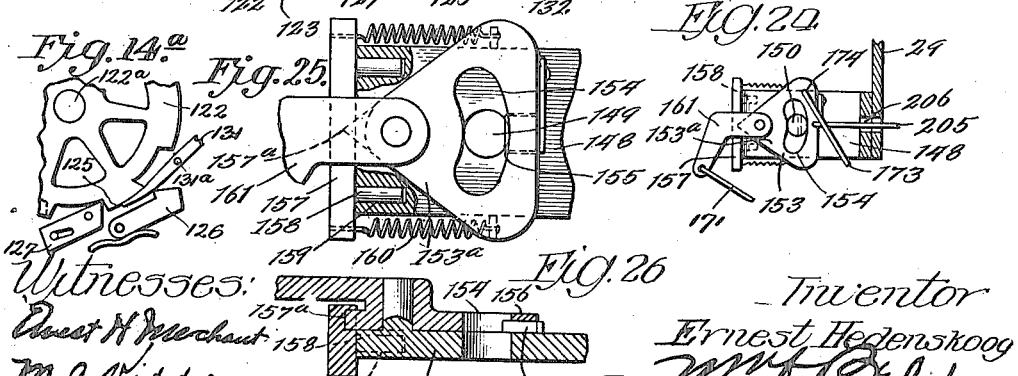

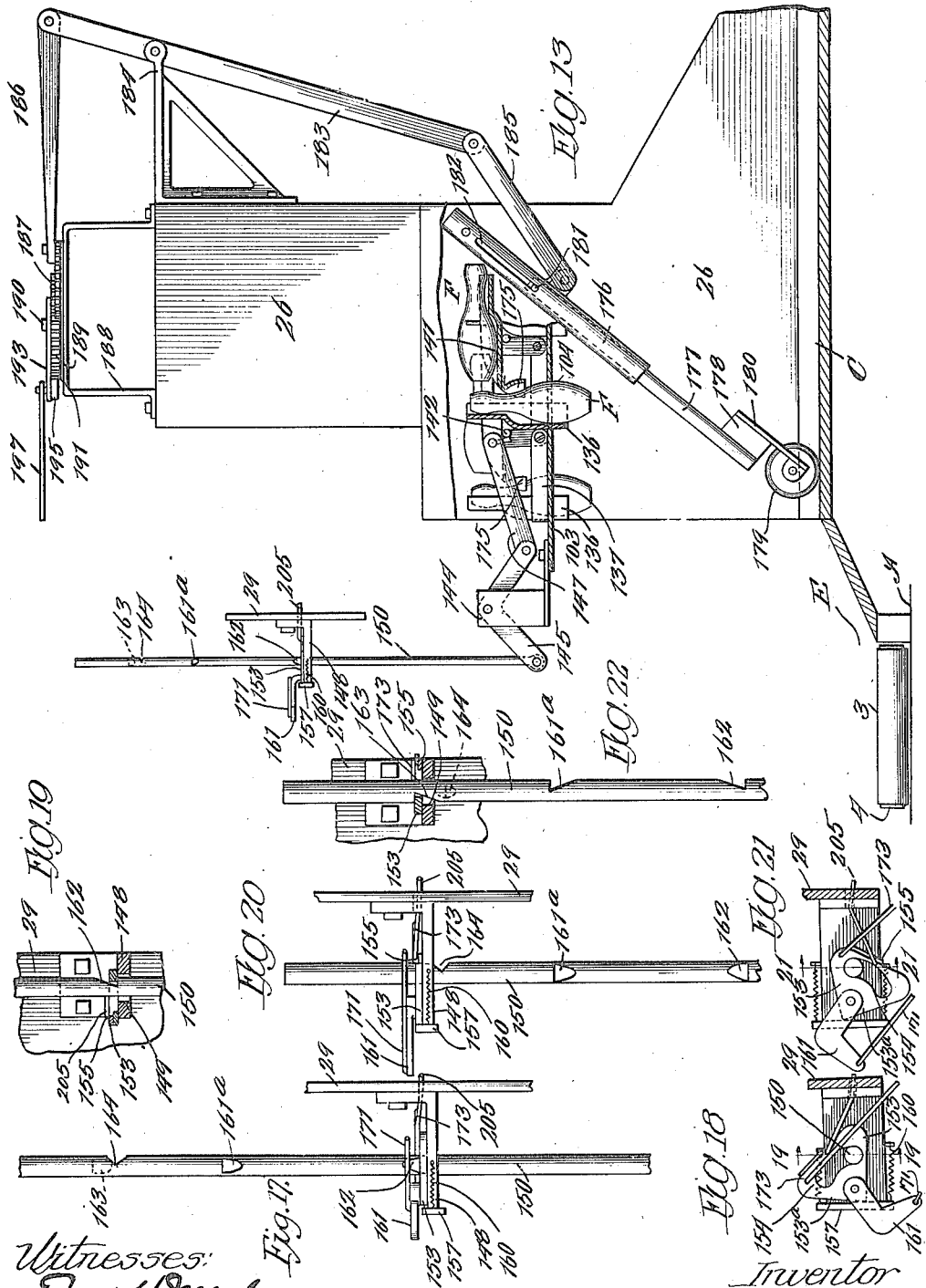

UNITED STATES PATENT OFFICE.

ERNEST HEDENSKOOG, OF MUSKEGON, MICHIGAN, ASSIGNOR TO THE BRUNSWICK-BALKE-COLLENDER COMPANY, OF CHICAGO, ILLINOIS, A CORPORATION OF DELAWARE.

MACHINE FOR SETTING PINS ON BOWLING-ALLEYS.

1,190,651.  Specification of Letters Patent.  Patented July 11, 1916.

Application filed October 28, 1914. Serial No. 868,939.

*To all whom it may concern:*

Be it known that I, ERNEST HEDENSKOOG, residing at Muskegon, in the county of Muskegon and State of Michigan, a citizen of the United States, have invented certain new and useful Improvements in Machines for Setting Pins on Bowling-Alleys, of which the following is a specification.

My invention relates to devices for resetting the pins on bowling alleys and returning the balls to the rack, and has for one of its objects the provision of mechanism by which the pins after falling in the pit, at the rear of the alley, are automatically conveyed to the resetting mechanism and distributed thereon in position so that when reset they are in the proper position on the alley for play, while the balls are automatically returned to the rack at the side of the alley. This operation is accomplished without the intervention of strings, chains or other devices secured to the pins, or any construction to alter the relative proportions or the weight of the different parts of the pin.

Another object of my invention is the provision of a device consisting of a setting magazine, a storage magazine to empty into the setting magazine, an assembling magazine to empty into the storage magazine, and means to convey the pins from the pit to the assembling magazine.

Another object of my invention is the provision of means by which the pins are always presented to the assembling magazine butt end foremost.

Another object of my invention is the provision of means by which the pins in the assembling magazine are dumped into the storage magazine as soon as a full set of pins is contained therein.

Another object of my invention is the provision of mechanism by which the alley and gutters may be cleaned of "dead wood" after each shot, the "live" pins being retained in their proper positions.

The construction and operation of my improved machine will be described in detail hereinafter and illustrated in the accompanying drawings in which—

Figure 1 is a top plan view of my improved pin setting machine, Fig. 2, a side view partly broken away, Fig. 3, a cross section on the line 3—3 of Fig. 1 looking in the direction of the arrows, Fig. 4, a central, longitudinal, vertical sectional view of a fragment of the machine showing its position immediately after the assembling magazine has been dumped, Fig. 5, a top plan view of the assembling magazine, Fig. 6, a cross section on the line 6—6 of Fig. 5, looking in the direction of the arrow, Fig. 7, a bottom plan view of the storage magazine, Fig. 8, a sectional view thereof on the line 8—8 of Fig. 7 looking in the direction of the arrow, Fig. 9, a top plan view of the setting magazine, Fig. 10, a central longitudinal sectional view of the setting magazine, Fig. 11, a fragmental detail view of the mechanism for operating the assembling magazine showing it in the position when a pin is being delivered to one of the compartments in the magazine, Fig. 12, a fragmental sectional view of the elevator, Fig. 13, a fragmental view, partly broken away showing the operation of clearing the alley of dead wood, Fig. 14, a fragmental plan view of the mechanism controlling the operation of the setting magazine, Fig. 14$^a$ is a fragmentary view of the structure illustrated in Fig. 14 with certain parts omitted, Fig. 15, a side view thereof, Fig. 16, an end view partly in section, Fig. 17, a side view of the trip mechanism for the setting magazine in position to set the pins, Fig. 18, a top plan view of the mechanism shown in Fig. 17, Fig. 19, a cross section on the line 19—19 of Fig. 18, looking in the direction of the arrow, Fig. 20, a side view of the trip mechanism in position to grip live pins to lift them from the alley, Fig. 21, a top plan view of the mechanism as illustrated in Fig. 20, Fig. 22, a cross section on the line 22—22 of Fig. 21 looking in the direction of the arrow, Fig. 23, a view partly in section showing the position of the trip mechanism in position to reset the live pins, Fig. 24, a top plan view of the trip mechanism in the position shown in Fig. 23, Fig. 25, a view on an enlarged scale of the trigger, and Fig. 26, a central longitudinal sectional view of the trigger as illustrated in Fig. 25.

In the drawings similar reference characters indicate corresponding parts in all the views.

A indicates the floor (shown in Fig. 2) on which is erected the bowling alley B having the usual gutters C, while D indicates the ball rack at one side of the alley B. A drive shaft 1 is journaled on uprights 2 mounted on floor A and is driven by any suitable power to operate the various mechanisms hereinafter described. The rear of the alley B is provided with the usual pit E to receive the pins F and balls G, and has the swinging cushion H forming its rear wall. The floor of the pit consists of an endless belt conveyer 3 mounted on drums 4 and driven by gearing 5 connected up to shaft 1. The conveyer 3 delivers into the casing 6 in which is mounted an endless chain elevator or conveyer consisting of the chains 7 and slanting and concaved shelves 8 that form pockets with the side of casing 6 to carry the balls and pins upward. The elevator casing extends below the floor A to form a pit 9 at the bottom of the casing to receive the pins F and balls G from the conveyer belt 3.

10 indicates a cylindrical casing located adjacent to casing 6 and having a shaft 11 journaled therein with a wheel 12 keyed thereto. Blades 13 are secured to wheel 12 and consist of angular shaped pieces as shown, having one portion 13ª that forms with the bottom 10ª of the casing 10 a cup or rest for a pin or ball, while the other portion 13ᵇ is spaced from portion 13ª substantially the width of a single pin and is at an angle to the bottom so that before the blade reaches the delivery opening 14 of the casing the part 13ᵇ will be at such an angle to the perpendicular that should more than one pin be carried by a single blade 13 the pins in excess of one will drop by gravity to the bottom of the casing and not more than one pin will be delivered at a time by wheel 12 through opening 14.

15 and 16 indicate brackets or supports secured to casings 6 and 10 respectively and 17 a shaft journaled therein, while 18 indicates a chain and sprocket gearing or its equivalent connecting shafts 1 and 17.

18ª indicates a chain and sprocket gearing or its equivalent connecting shafts 11 and 17.

19 indicates a shaft journaled on the side of casing 6 and geared to shaft 17 by beveled pinion 20 keyed to shaft 17 and beveled pinion 21 keyed to shaft 19.

22 indicates a chain and sprocket gearing or its equivalent for operating the elevator 7.

23 indicates a spout connecting the delivery opening 6ª of elevator casing 6 and cylindrical casing 10 said spout 23 being also pitched slightly to the side to deliver into trough 24 connected with the bell rack D, the opening 25 at the delivery end of spout 23 being high enough to allow only pins, and balls of the same or smaller diameter than the pins, to pass through it, the larger balls being directed into the trough 24 from whence they pass directly into the ball rack D.

26 indicates uprights at each side of the alley B, 27 a top board secured to said uprights and 28 a horizontal partition secured intermediate of their top and bottom.

29 indicates an upright secured to horizontal partition 28 and 30 a trough secured to cylindrical casing 10 below the delivery opening 14 thereof.

31 indicates an endless belt conveyer mounted on rollers 32 and 32ª in trough 30 to convey pins from the casing 10, from which they are delivered one by one to the assembling magazine to be hereinafter described.

For the successful operation of my machine it is necessary that the pins be delivered to the assembling magazine butt foremost, and to insure this a peculiarly constructed spout 33 is secured below the delivery opening 14 and delivering to the trough 30 and belt 31. Said spout has a curved rear side 34 and a partition 35 secured midway of the width of the spout which is also curved substantially parallel with the rear side 34. The partition 35 engages the middle of the pins and as their butt ends are the heavier the partition will cause the pin to fall in an upright position, the curved rear side 34 guiding the pins that are presented with their heads toward the front of the alley, while the partition 35 guides the pins that emerge from the opening 14 in a reversed position. The balls that are as small in diameter or smaller than the diameter of the butt of the pins, or small enough to pass through opening 25, are delivered through opening 14 and into spout 33. The ball after reaching the conveyer belt 31 rolls into trough 36 which delivers into trough 24 so that the ball is conveyed to the ball rack D.

37 indicates a shaft journaled on uprights 38 secured to floor A and geared to shaft 1 by means of beveled pinions 39, a chain and sprocket gearing 40 connecting shaft 37 and stub shaft 41, extending from roller 32 to actuate belt 31.

The assembling magazine is mounted on a frame consisting of a plate 42, (Figs. 4, 5 and 6) secured to the lower end of and rotatable therewith, a shaft 43 journaled in the top plate 27 and having a ring 44 secured thereto by means of struts 45, and a circular plate 46 supported by means of posts 47. Plate 46 is provided with holes 48 (Fig. 5) each of a shape somewhat approximating that of a pin and large enough for the passage of a pin therethrough and forming a triangle corresponding to the position of the pins when set up on an alley in the game of ten pins. Above the large end of each hole 48 corresponding to the butt of a pin is secured an inclined cylindrical casing 49 with an opening 50 (Figs. 4 and 6) on its underside over said hole 48, and a chute 51 secured to its upper edge and to ring 44, said magazine being actuated, by the instrumentalities hereinafter described, so that the chutes 51 successively stop under the delivery end of trough 30 and belt 31, to receive a pin F therefrom.

52 indicates vertical guides secured adjacent to each side of each hole 48 to prevent sidewise displacement of the pins as they leave the chutes 51 to pass through the holes 48.

Referring to Fig. 5 53 indicates uprights secured to the plate 46, 54 a pair of rods mounted to slide transversely in said uprights a distance substantially equal to the width of the openings 50 in the casings 49 and 55 bars secured to said rods. 56 indicates a cross bar connecting said bars 55, and 57 a bracket secured to each of the bars 55. 58 indicates plates secured to rods 54, cross-bar 56 and brackets 57. The object of the plates 58 is to cover the openings 50 and form doors to hold the pins in the casings 49 and the rods 54, cross-bars 56 and brackets 57 serve to support the plates 58 in proper relative position. As stated, the rods 54 are slidably mounted in uprights 53 and to provide for sliding the frame consisting of rods 54 and bars 55 I provide a trip 59, secured to one of the uprights 26, that engages a projection 60 on one of the bars 55 as the plates 42 and 46 revolve in a clockwise direction to push the frame aforesaid with the plates 58 in a direction opposite to the direction of movement of the plates 42 and 46 so that the openings 50 are exposed temporarily to dump the pins from casings 49 through holes 48. Spring 61 secured to one of the rods 54 and one of the casings 49 returns the frame and plates to their normal position after the projection 60 passes the trip 59.

Horizontal partition 28 is provided with openings 62 which register with holes 48 when the assembling magazine is in the position to dump, or when the projection 60 engages trip 59.

63 indicates a wall surrounding each opening 62 to form a pocket to receive the pins when dropped through the holes 48 and openings 62 as above described.

64 indicates a plurality of angle members (Fig. 7) secured to the under side of partition 28 to brace it and also to act as spacing means for plate 65 which is suspended from partition 28 by means of bolts 66 secured to the partition 28 and engaging slots 66ª in plate 65, and is slidable laterally with respect to the partition 28. The plate 65 is provided with openings 65ª therein which are held out of register with pockets 63, normally, by means of springs 67 secured to the plate 65 and the partition 28. This portion of my device will hereinafter be called the storage magazine.

It will be apparent that for a successful operation of my improved machine it will be necessary to move the chutes 51 on the assembling magazine opposite the delivery end of trough 30, successively, and hold the chute in said position until a pin has been delivered to the chute, and then to move the magazine far enough only to bring the next succeeding chute into place opposite the trough 30. By reference to the drawings it will be seen that the chutes are not equally distant apart the space between two chutes at two different places being double what it is at the other places, so that it is not only necessary to give the assembling magazine a step by step motion but also provide for moving it unequal distances and this mechanism as well as the mechanism by which the filling of the assembling magazine is accomplished will now be described in detail.

68 indicates a wheel secured to shaft 43 having twelve teeth 69 projecting therefrom, ten of the notches between the teeth 69, indicated at 70 being deeper than the remaining notches 71.

72 indicates an arm loosely mounted on shaft 43 having a spring pawl 73 mounted thereon that engages teeth 69.

74 indicates a vertical shaft geared to beveled pinion 20 on shaft 17, by means of beveled pinion 75, and having a gear wheel 76 keyed to its upper end.

77 indicates a gear wheel journaled on bar 78 and having a disk 79 thereon.

80 indicates a pitman connecting the free end of arm 72 and a pin 81 on disk 79.

82 indicates a plate (Figs. 4 and 11) loosely mounted on shaft 43, between wheel 68 and arm 72 and having hooks 83 projecting therefrom that engage the under side of the wheel 68.

84 indicates a lever, fulcrumed at 84' (see also Fig. 2) on plate 82 and having a block 85 secured to one end of a size to fill notches 70 when the block 85 is in its normal or lower position, but which can not enter notches 71 because of the lesser depth thereof. A lug or projection 86 extends from the upper surface of lever 84 adjacent to the end farthest from block 85.

87 indicates a spring to hold the block end of the lever in a lowered position normally, said end being movable vertically against the action of the spring 87.

88 indicates a projection, extending from plate 82, which covers a notch 70 or 71, immediately opposite pawl 73, when the block 85 is in engagement with one of the notches 70 and prevents said pawl from engaging the tooth 69 adjacent to the covered notch, so that the wheel 68 remains stationary.

A pawl 89 is secured to the top plate 27 adjacent to wheel 68 and is connected to plate 82 by means of a spring 90, said pawl acting to retard the rotation of said wheel and also hold it from backward motion. Spring 90 also serves to move the plate 82 when the block 85 is raised from engaging a notch 70 by the instrumentalities hereinafter described.

91 indicates a projection extending from plate 82 and 92 a pin secured to top board 27 that engages said projection to limit the swinging of said plate under the impulse of spring 90.

A shaft 93 is journaled in supports 94 secured to top board 27, said shaft being actuated by shaft 95 which is geared thereto by beveled gearing 95$^a$. Shaft 95 is geared to stub shaft 41 by means of beveled gearing 96 (Fig. 2).

97 indicates an arm loosely mounted on shaft 93 (Fig. 11) having a roller 98 journaled on its free end, said roller being adjacent to the delivery end of the trough 30 and when in its normal position is spaced from the belt 31 and roller 32$^a$ a less distance than the diameter of the thickest part of one of the pins F so that the pins to get between the roller 98 and belt 31 raise the arm 97.

99 indicates chain and sprocket gearing connecting the shaft 93 and trunnion 98$^a$ of roller 98.

A rod 100 is secured to and extends rearwardly from the arm 97 and is provided with plate 101 on its free end which moves up and down as the arm 97 turns about the shaft 93 and engages the free arm of lever 84 when the arm 97 is raised by a pin passing between belt 31 and roller 98.

102 indicates a stop (Fig. 4) secured to top board 27 and engaging arm 97 to limit the downward movement of the end of the arm adjacent the trough 30.

It will be understood that when the block 85 is in engagement with one of the notches 70 one of the chutes 51 supported by the plate 42 at the lower end of the shaft 43 is opposite the delivery end of trough 30 ready to receive a pin F, the pawl 89 also engaging one of the notches 70 or 71. When a pin F passes between roller 98 and belt 31 the arm 97 is raised lowering the end of rod 100 so that plate 101 engages the free arm of lever 84 and raises the block 85 from engagement with the notch 70 aforesaid. The shoulder 86 engaging the plate 101 prevents the movement of the plate 82 in an anti-clockwise direction under the impulse of the tensioned spring 90, thus insuring that the projection 88 on the plate 82 will continue to cover the notch 70 or 71 which lies adjacent the pawl 73 so that the pawl does not engage the tooth 69 formed by the notch 70 or 71 to turn the wheel and the assembling magazine, until the pin F passes into the chute 51. When the pin F passes into the chute 51 the arm 97 drops by gravity until it engages the stop 102, thereby raising the plate 101 from engagement with the shoulder 86 and releasing the plate 82 to the impulse of the tensioned spring 90 and the lever 84 to the impulse of the spring 87. The plate 82 is moved in an anti-clockwise direction by the spring 90 toward the pawl 89 which meanwhile holds the wheel 68 from rotation. During the movement of the plate 82 the block 85 registers with a notch 70, provided a notch 70 succeeds the notch last engaged by the block 85, and locks the plate 82 to the wheel 68. If a notch 71 succeeds the notch last engaged by the block 85 the plate 82 is stopped by the engagement of the projection 91 with the pin 92, and the block 85 rides on the wheel 68 until a notch 70 is positioned thereunder in the succeeding operation, whereupon the block 85 drops into the notch 70, as previously described, to lock the plate 82 to the wheel 68. Meanwhile the projection 88 on the opposite side of the plate 82 uncovers the notch 70 or 71 over which it is normally disposed to prevent engagement of the pawl 73 with the tooth 69 corresponding to the notch 70 or 71 which is covered, and the pawl 73 is thereby allowed to engage the tooth 69 so that the wheel 68 will be turned in a clockwise direction by the pawl 73, which is constantly reciprocated through the arm 72 connected by the pitman 80 to the gearing previously described. If the block 85 has engaged a notch 70 to lock the plate 82 to the wheel 68 a single actuation of the wheel 68 by the pawl 73 will suffice to cause the projection 88 to again cover the notch 70 or 71 in the path of the pawl 73 and the pawl 73 will thereafter reciprocate idly until the next bowling pin F releases the mechanism. If, however, a notch 71, is positioned beneath the block 85 the plate 82 will not rotate with the wheel 68 at the first actuation thereof and hence the projection 88 will not be positioned to prevent engagement of the pawl 73 with a tooth 69. The wheel 68 will, therefore, be actuated a second time by the pawl 73 to position a notch 70 beneath the block 85 whereupon the plate 82 will be locked to the wheel 68 and further actuation of the wheel 68 by the pawl 73 will be prevented by the projection 88 until another pin F releases the mechanism. It will be understood that by means of this mechanism the wheel 68 will rotate step by step, the distance through which it moves being equal to the spacing of the notches 70. At intervals a notch 71 intervenes between the notches 70 and the wheel 68 moves twice the distance of its normal movement whenever a notch 71 is positioned beneath the block 85, the movement taking place in two steps. At the end of each movement corresponding to the distance between the notches 70, a chute 51, connecting with a casing 49 succeeding the one previously filled, is positioned opposite the trough 30 to receive the next pin F. When the assembling magazine has made a complete rotation so that the trip 59 is engaged by the projection 60 on the bar 55 the plates 58 will be moved from their position covering the openings 50 to the casings 49, so that the pins will be allowed to drop into the pockets 63 of the storage magazine ready to refill the setting magazine as hereinafter described.

The setting magazine comprises a plate 103 having a series of holes 104 therein placed in the relative positions of the pins when set on the alley bed, the plate 103 being slidably supported by the vertical bars 105 secured thereto which are mounted in tubular guides 106 secured to brackets 107 extending from horizontal partition 28. The upper ends of bars 105 are formed with rack faces 108 that mesh with pinions 109 on horizontal shaft 110 journaled in brackets 111 secured to uprights 26. 112 indicates a vertical shaft journaled in bearing 113, secured to one of the brackets 111, and in plate 114 secured to bracket 115 extending from partition 28. Shaft 112 has keyed thereto a beveled pinion 116 that meshes with beveled pinion 117 on horizontal shaft 110. By this construction it will be understood that when the shaft 112 is rotated the shaft 110 is actuated and the plate 103 is raised or lowered corresponding to the direction of rotation of said shafts.

The gearing to operate shaft 112 comprises a shaft 118 journaled in bracket 115 and bearing 119 secured to one of the uprights 2. Shafts 1 and 118 are geared together by beveled pinion 120 secured to shaft 118 and pinion 121 on shaft 1 so that shaft 118 is given a continuous rotation in one direction.

A wheel 122 is journaled on stub shaft 122$^a$ secured to plate 114, said wheel having a segmental gear face 123 thereon which meshes with a pinion 124 keyed to the lower end of shaft 112, the length of said gear face 123 being sufficient to so rotate shafts 112 and 110 as to raise or lower plate 103 its full distance.

A tooth 125 (Figs. 14 and 15) extends from the periphery of wheel 122 at a point spaced from the end of the gear face 123. The tooth 123 is engaged by spring-actuated pawls 126 and 127 on arm 128 journaled on stub shaft 122$^a$. An arm 129 (Fig. 1) secured to upper end of shaft 118 is operatively connected to arm 128 by means of pitman 130.

From this description and an inspection of the drawings it will be apparent that the rotation of shaft 118 and arm 129 imparts a rocking motion to arm 128 so that if the pawls 126 and 127 are in engagement with tooth 125 the wheel 122 is also given a rocking motion and through gear face 123 and pinion 124 rotates shaft 112, first in one direction and then in another, to lower plate 103 and then to raise it.

It will be apparent that to hold the plate 103 in its raised position the wheel 122 must be retained in a stationary position and to accomplish this the pawl 126 must be prevented from engaging tooth 125. To this end I provide a rod 131 slidably mounted in supports 132, mounted on bracket 133, extending from partition 28, and having a tongue 134 on one end that normally covers tooth 125 and prevents pawl 126 from engaging it. The rod 131 is slid from engagement with tooth 125 by the instrumentalities hereinafter described so as to permit pawl 126 to engage said tooth and start the mechanism to actuate plate 103, and is returned to its normal position with tongue 134 and tooth 125 in engagement immediately thereafter by the engagement of a lug or projection 135, on wheel 122, with a pin 131$^a$ on the rod 131.

122$^b$ indicates a guard on the top of wheel 122 to prevent pawls 126 and 127 from engaging with gear face 123 when the wheel is held stationary as above described, the pawls 126 and 127 being of sufficient width to engage the guard 122$^b$.

136 indicates a semi-cylindrical casing secured to the rear edge of each hole 104 having its lower portion larger in diameter than its upper portion, being the relative proportions of the butt and head of a pin F. 137 indicates a bar secured to each casing 136 having its ends extended on parallel planes, indicated at 138, and spaced apart, and 139 an arm pivoted between said ends 138 by means of a bolt 140 secured to said ends 138.

141 indicates a semi-cylindrical casing of the same relative shape as the semi-casing 136 and secured to the free end of each arm 139. Semi-casings 141 when in their horizontal position, shown in Figs. 2 and 4, form cups to receive and hold a full set of pins ready to be set on the alley.

142 indicates cross-rods secured to arms 139 and connected by links 143 to cause the casings 141 to swing simultaneously when actuated by the mechanism to be hereinafter described.

144 indicates a bracket on the rear of plate 103 having a bell-crank lever 145 fulcrumed thereon with one arm connected with a bracket-pin 146, secured to the rearmost rod 142, by means of a link 147.

148 indicates a bracket secured to upright 29 having a hole 149 therein and 150 a rod pivotally secured to the free arm of bell-crank lever 145 and slidably mounted in hole 149.

153 indicates a trigger pivotally secured to bracket 148. Said trigger 153 is provided with a curved slot 154, inclosing the rod 150, and a spring clamp 155 secured thereto and extending in a groove 156 to the slot 154 to engage rod 150 when the trigger is set midway of the ends of the slot.

157 indicates a plate having pins 158 seated in sockets 159 in the end of bracket 148 and 160 coil springs secured to the sides of bracket 148 and plate 157 to hold the plate normally in engagement with the end of the bracket. The trigger 153 has an angular portion 153$^a$ that engages plate 157, one or the other side being in engagement when the trigger is swung so that one of the ends of the slot 154 engages the rod 150 to insure holding the trigger in engagement with the rod, while when the trigger is actuated so that the rod is midway of the ends of the slot the pointed end of the angular portion 153$^a$ engages a notch 157$^a$ in the plate to hold the trigger in that position.

161 indicates an angular arm secured to trigger 153.

The rod 150 is provided with notches 161$^a$ and 162 on one side thereof, a notch 163 on the other side and a notch 164 on the side toward the front of the alley. When the trigger 153 is positioned so that it engages the side having the notches 161$^a$ and 162 therein, and the plate 103 is lowered, the trigger will enter the notch 161$^a$ when the plate 103 is near the floor of the alley, holding the rod and swinging the bell-crank lever 145 so as to swing the cups 141 into a vertical position and deposit the pins therein on the floor of the alley in position for bowling. When the plate is raised, and the trigger is in the same position, it engages notch 162 and the cups are swung back into a horizontal position ready to receive another set of pins from pockets 63 of the storage magazine.

In order to dump the contents of the pockets 63 into the cups 141 I provide a trip mechanism consisting of a curved and pointed blade 165 (Fig. 9) secured to the end of one of the rods 142 and having a straight side 166 and a slanting side 167.

168 indicates a pin (Figs. 7 and 8) on the horizontal partition 28 and 169 a pin on sliding plate 65 so that when the plate 103 is raised and the cups 141 are thrown to their horizontal position, as above described, the blade 165 passes between the pins 168 and 169 and pushes the plate 65 to one side so that the openings 65$^a$ register with the pockets 63 and the pins F drop from the pockets 63 into the cups 141. Upon the next actuation of the setting magazine to deposit a set of pins on the alley bed, the downward movement of the plate 103 will free the blade 165 from the pins 168 and 169 and the movement of the casings 141 to pin depositing position will return the blade 165 to position to again separate the pins 168 and 169 when the plate 103 reaches its uppermost position and the casings 141 are again disposed in horizontal position.

As hereinbefore stated, as long as the tongue 134 covers the edge of tooth 125 to prevent pawl 126 from engaging it, the plate 103 will remain in its raised position. In order to move the plate 103 downward, to set up a set of pins, the rod 131 must be moved so that tongue 134 does not engage tooth 125, and pawl 126 may engage it, permitting wheel 122 to be turned, and actuating the plate by the mechanism hereinafter described.

The mechanism for actuating rod 131 may consist of any device that will exert a pull on said rod but for the purposes of illustration I have shown the operating mechanism to consist of a cord or wire 170 extending from the playing end of the alley and secured to the end of the rod 131. A branch cord or wire 171 secured to cord or wire 170 connects it with arm 161 so that when cord or wire 170 is pulled, to slide rod 131, the trigger 153 is swung so as to engage the side of rod 150 having notches 161$^a$ and 162 thereon.

During play after one ball has been rolled and one or more pins are left standing and dead wood is lying on the alley and in the gutters, it is, in accordance with some rules for playing the game, necessary to clear the dead wood from the alley before the next play. To accomplish this the trigger 153 is swung so that the side of the rod having the notch 163 thereon is engaged by it. This may be done by any mechanism such as a cord or wire 172 extending from the player's end of the alley to the rod 131 and having a branch cord or wire 173 connected with the trigger as shown at 174. When string 172 is pulled the rod 131 is slid back so that tongue 134 does not engage tooth 125 and at the same time the trigger is thrown around as stated. When the trigger 153 engages the notch 163, which is as shown near the top of rod 150, the pin or pins F standing on the alley have entered between the stationary casing 136 and the end of cup or cups 141, the rod 150 is then held stationary giving the cups 141 a slight swing so as to clamp the head of the standing pin or pins between the ends of the cups 141 and casings 136, and when the plate 103 is raised the pins are also lifted, it being apparent that the weight of the pins holds the cups 141 in a clamping position. As the pin or pins F that it is desired to lift may have been moved slightly from their correct position on the floor of the alley I provide a guide on the end of each cup 141 consisting of a concave plate or cup 175 that acts to guide the head of the pin into position to be clamped.

To clear the alley of dead wood I provide a sweep consisting of tubular rods 176 pivotally secured to uprights 26, rods 177 slidably mounted therein and a cross-bar 178 connecting the lower ends of rods 177.

179 indicates wheels or rollers journaled at each end of cross-bar 178 that run in the gutters C at the sides of the alley B to hold the cross bar from engagement with the floor of the alley, while the journals at each side of the rollers are extended forming wings 180 to clear the gutters C of dead wood.

181 indicates a pin on each rod 177 that rides in a longitudinal slot 182 in each tubular rod 176 to limit the outward movement of rod 177.

183 indicates a lever fulcrumed on bracket 184 secured to one of the uprights 26 and having its lower end connected with one of the tubular rods 176 by means of a link 185. The upper end of the lever 183 is connected by pitman 186 to a pin on gear wheel 187 journaled on a platform 188 mounted on top board 27.

189 indicates another wheel journaled on stub shaft 190 secured to platform 188, and provided with a gear face 191 on its periphery that meshes with gear wheel 187 and a tooth 192 extending therefrom.

193 indicates an arm journaled on shaft 190 having spring pawls 194 and 195 pivotally secured thereto that normally engage the tooth 192.

196 indicates an arm secured to shaft 112, and 197 a pitman connecting arms 193 and 196.

198 indicates a rod slidably mounted in uprights 199 on platform 188 and having a tongue 200 to normally cover the tooth 192 to prevent pawl 194 from engaging it.

201 indicates a pin or rod 198 and 202 a lug on wheel 189 to engage the pin and push the rod so that tongue 200 covers the tooth.

The construction and mode of operation of the parts last described is identical with that of the structure illustrated in Figs. 14 and 14ª and reference is made thereto for the illustration thereof.

The rod 198 is pulled back so as to expose tooth 192 to the action of pawl 194 by any mechanism such as a cord or wire 203 having a branch cord or wire 204 secured to rod 131 and another branch cord or wire 205 secured to branch cord or wire 204, the last mentioned cord or wire being passed through a hole 206 in upright 29 and secured to the middle of trigger 153 so that spring clamp 155 engages rod 150, and when the plate 103 is lowered the clamp 155 enters notch 164 and jolts the rod so as to release the lifted pin or pins F.

From this description it will be understood that after the live pins have been lifted as above described and plate 103 has assumed its highest position, cord or wire 203 is pulled. When cord or wire 203 is pulled branch cord or wire 205 actuates the trigger 153 so that spring clamp 155 engages rod 150, branch cord or wire 204 draws back rod 131 so that tooth 125 is uncovered to the action of pawl 126, and rod 198 is drawn back to release tooth 192 to the action of pawl 194. This will cause the sweep mounted on tubular rods 176 to swing under the plate 103 and clear the dead wood in the alley into pit E and swing back again before the plate 103 gets low enough to interfere with it. After resetting the pin or pins F the plate 103 is returned to its raised position and remains there until operated again by pulling one of the cords or wires 170 or 172 to reset the alley or pick up live pins thereon.

206' indicates a branch cord or wire connecting cord or wire 170 with cord or wire 203 so as to operate the sweep by the mechanism hereinabove described ahead of the plate 103 when setting up a new set of pins.

207 indicates a weight secured to one end of chain or rope 208 mounted on pulleys 209 and having its other end secured to one of the bars 105 to counterbalance the weight of the plate 103 and the mechanism mounted thereon.

The mode of operation of the various parts has been set forth in connection with the description thereof but the following description should make the operation of the machine as a whole more readily understandable. In the operation of the machine twenty-nine pins are preferably employed, of which normally ten will be disposed in the setting magazine, 10 in the storage magazine and nine in the assembling magazine. When the play is about to start the player pulls the cord or wire 170 which, through the mechanism described, causes the sweeper to clear any pins which may be thereon from the alley bed and releases the actuating mechanism of the setting magazine which thereupon descends and positions a set of pins upon the alley bed. As the setting magazine moves upwardly and the casings 141 return to their horizontal position the blade 166 will, through its engagement with the pins 168 and 169, release a set of pins from the storage magazine, which pins will fall onto the casings 141 where they remain in readiness for a new set. Meanwhile the player rolls a ball along the alley bed and some of the pins are knocked down, whereupon it becomes necessary to remove the fallen pins or deadwood before the second ball is rolled. The operator then pulls the cord or wire 172 which, through the mechanism described, causes the setting magazine to descend and grip the heads of the standing pins and raise them from the alley bed. The player then pulls the cord or wire 203 which releases the sweeper actuating mechanism to cause the sweeper to pass over the alley bed and remove the deadwood.

Branch cords 204 and 205, connected to the cord 203, release the setting magazine to replace the lifted pins upon the alley bed following the operation of the sweeper. The player then rolls another ball and pulls the cord or wire 170 to obtain a new set. A branch cord 206' releases the sweeper mechanism to clear the alley of all pins before the setting magazine deposits a fresh set of pins upon the alley bed. During the preceding operations the pins removed from the alley bed are picked up by the elevator and as soon as a pin is deposited in the last remaining chute 51 of the assembling magazine (it being understood that nine pins are already in place in the assembling magazine) the projection 60 will engage the trip 59 to release a set of pins from the assembling magazine from which they fall into the storage magazine which, as previously pointed out, has already deposited the set of pins originally held therein onto the casings 141 of the setting magazine. As soon as the set of pins has been released from the assembling magazine a new set of pins will accumulate therein, being raised one by one by the elevator mechanism, but since only twenty-nine pins are employed the set can not be completed in the assembling magazine until the storage magazine has released the set previously assembled and deposited therein and is again free to receive a new set.

From the foregoing it will be seen that the cycle of operations, consisting of assembling the pins, depositing them first in the storage magazine and then in the setting magazine, will continue indefinitely so long as the player operates the cords or wires to position sets of pins upon and to remove the pins from the alley bed.

It will be readily understood that various changes may be made in the form, construction and arrangement of the parts without departing from the spirit and scope of the invention or sacrificing any of its material advantages, the form hereinbefore described being merely preferred embodiments thereof.

Having thus described my invention what I claim is—

1. In a pin setting device for bowling alleys, setting mechanism, assembling mechanism adapted to support a set of pins, a spout for feeding the pins to the assembling mechanism having a central partition, and means to feed the pins to the spout in a horizontal position so that the partition aforesaid engages them and delivers them in an upright position.

2. In a pin setting device for bowling alleys, setting mechanism, assembling mechanism adapted to support a set of pins, a spout for feeding the pins to the assembling mechanism having a central partition, and means to feed the pins to the spout in a horizontal position so that said partition engages them in their middle and throws the center of gravity of the pin on one side of the partition.

3. In a bowling alley pin setting apparatus, mechanism for setting the pins, assembling mechanism adapted to support a set of pins, a conveyer to carry the pins to the assembling mechanism, and mechanism utilizing the difference in weight of the ends of the pin to always throw the pin on the conveyer butt end foremost.

4. In a bowling alley, mechanism to clamp the set pins and raise them from the alley, and mechanism to clear the alley of down pins.

5. In a bowling alley pin setting apparatus, a magazine for assembling the pins comprising a rotatable structure, and pin compartments arranged in said magazine in the relative positions of pins when set on the alley.

6. In a bowling alley pin setting apparatus, a magazine for assembling the pins comprising a rotatable structure, pin compartments arranged in said magazine in the relative positions of pins when set on the alley, and spouts for conveying pins to said compartments.

7. In a bowling alley pin setting apparatus, a magazine for assembling the pins comprising a rotatable structure provided with openings, compartments for pins secured adjacent to said openings, and means to simultaneously dump the contents of said compartments through said openings.

8. In a bowling alley pin setting apparatus, a magazine for assembling the pins comprising a rotatable structure provided with openings in the relative positions of the pins when set on the alley, compartments for the pins secured adjacent to said openings and having openings over the openings in the magazine, and sliding doors closing the openings in the compartments.

9. In a bowling alley pin setting apparatus, a magazine for assembling the pins comprising a rotatable structure provided with openings in the relative positions of pins when set on the alley, compartments for the pins secured adjacent to said openings and having openings over the openings in the magazine, sliding doors closing the openings in the compartments, and means to actuate said doors simultaneously to dump the contents of the compartments through the openings aforesaid.

10. In a bowling alley pin setting apparatus, a magazine for assembling the pins comprising a rotatable structure provided with openings in the relative positions of pins when set on the alley, compartments for the pins secured adjacent to said openings and having openings over the openings in the magazine, a frame slidably mounted on the magazine, and doors secured to said frame and closing the openings to the compartments.

11. In a bowling alley pin setting apparatus, a magazine for assembling the pins comprising a rotatable structure provided with openings, compartments for pins secured adjacent to said openings, spouts for conveying pins to said compartments, and means to simultaneously dump the contents of compartments through said openings.

12. In a bowling alley pin setting apparatus, a magazine for assembling the pins comprising a rotatable structure provided with openings in the relative positions of the pins when set on the alley, compartments for the pins secured adjacent to said openings and having openings over the openings in the magazine, sliding doors closing said openings in the compartments, and spouts for conveying pins to said compartments.

13. In a bowling alley pin setting apparatus, a magazine for assembling the pins comprising a rotatable structure provided with openings in the relative positions of pins when set on the alley, compartments for the pins secured adjacent to said openings and having openings over the openings in the magazine, sliding doors closing the openings in the compartments, means to actuate said door simultaneously to dump the contents of the compartments through the openings aforesaid, and spouts for conveying pins to said compartments.

14. In a bowling alley pin setting apparatus, a magazine for assembling the pins comprising a rotatable structure provided with openings therein in the relative positions of pins when set on the alley, compartments for the pins secured adjacent to said openings and having openings over the openings in the magazine, a frame slidably mounted on the magazine, doors secured to said frame and closing the openings to the compartments, and spouts for conveying pins to said compartments.

15. In a bowling alley pin setting apparatus, mechanism to convey the pins from the alley, an assembling magazine to receive the pins from said conveying mechanism comprising a rotatable structure, compartments for holding individual pins mounted on said structure, and mechanism to impart a step by step movement to the said magazine so that each of said compartments is filled in turn.

16. In a bowling alley pin setting apparatus, mechanism to convey the pins from the alley, an assembling magazine to receive the pins from said conveying mechanism comprising a rotatable structure, compartments for holding individual pins mounted on said structure, a spout connected with each compartment and extending to the outer portion of the magazine, and mechanism to impart a step by step movement to said magazine to bring the spouts in alinement with the delivery end of the conveying mechanism.

17. In a bowling alley pin setting apparatus, mechanism to convey the pins from the alley, an assembling magazine to receive the pins from said conveying mechanism comprising a rotatable structure, compartments mounted on said rotatable structure for holding individual pins, mechanism to impart a step by step movement to said magazine to fill each compartment in turn, and mechanism to hold the magazine from movement in filling each compartment until a pin has been deposited therein.

18. In a bowling alley pin setting apparatus, mechanism for conveying the pins from the alley, an assembling magazine to receive the pins from said conveying mechanism comprising a rotatable structure, compartments mounted on said rotatable structure for holding individual pins, a spout connected with each compartment and extending to the outer portion of the magazine, mechanism to impart a step by step movement to said magazine to bring the spouts in alinement with the delivery end of the conveying mechanism, and mechanism to hold the magazine from movement while a spout is in alinement with the conveying mechanism until a pin has passed into the spout.

19. In a bowling alley pin setting apparatus, mechanism to convey the pins from the alley, as assembling magazine to receive the pins from said conveying mechanism comprising a rotatable structure, compartments mounted on said rotatable structure for holding individual pins, mechanism to impart a step by step movement to said magazine to fill each compartment in turn, and mechanism controlled by the pins to hold the magazine from movement in filling each compartment until a pin has been deposited therein.

20. In a bowling alley pin setting apparatus, mechanism to convey the pins from the alley, an assembling magazine to receive the pins from said conveying mechanism comprising a rotatable structure, compartments mounted on said rotatable structure for holding individual pins, mechanism to impart a step by step movement to said magazine to fill each compartment in turn, and mechanism controlled by the pins to hold the magazine from movement while a spout is in alinement with the conveying mechanism until a pin has passed into the spout.

21. In a bowling alley pin setting apparatus, a conveyer for the pins, a vertical shaft suitably journaled, an assembling magazine mounted on said shaft having a plurality of compartments to contain the pins and filled in turn from the conveyer aforesaid, a toothed wheel secured to said vertical shaft, means engaging the teeth of the wheel to rotate it, mechanism to throw said engaging means out of operative connection with the teeth, and means operated by the pins to release the teeth of the wheel to the action of the means to rotate the wheel.

22. In a bowling alley pin setting apparatus, a conveyer for the pins, a vertical shaft suitably journaled, an assembling magazine on said shaft having a plurality of compartments to contain the pins and filled in turn from the conveyer aforesaid, a toothed wheel secured to said vertical shaft, a rocking arm mounted on the shaft and carrying a pawl to engage the teeth on the wheel, a plate mounted on the shaft and having projections thereon to cover the teeth on the wheel to prevent the pawl from engaging them so that the wheel remains stationary, and mechanism operated by a pin passing from the conveyer to one of the compartments to move the plate so that the pawl engages the wheel.

23. In a bowling alley pin setting apparatus, a conveyer for the pins, a vertical shaft suitably journaled, an assembling magazine on said shaft having a plurality of compartments to contain the pins and filled in turn from the conveyer aforesaid, a toothed wheel secured to said vertical shaft, a rocking arm mounted on the shaft and carrying a pawl to engage the teeth on the wheel, a plate mounted on the shaft and having projections thereon to cover the teeth on the wheel to prevent the pawl from engaging them so that the wheel remains stationary, a lever mounted on the plate and having a block on one end to engage the teeth of said wheel, an arm suitably mounted having one end formed to engage the free arm of the lever aforesaid and lift the block on the other end out of engagement with the wheel, the other end of said arm being positioned adjacent to the delivery end of the conveyer aforesaid, the pins in passing from the conveyer to the magazine operating to lift the end of the arm and swing the lever aforesaid.

24. In a bowling alley pin setting apparatus, a magazine for storing the pins comprising a fixed plate, pockets on said plate, and slidably supported means to releasably secure the pins in the pockets.

25. In a bowling alley pin setting apparatus, a magazine for storing the pins comprising a fixed plate, pockets in said plate to hold the pins, and a plate slidably supported by the fixed plate and having openings therein to register with the pockets.

26. In a bowling alley pin setting apparatus, a magazine for storing the pins comprising a fixed plate, pockets in said plate to hold the pins, a plate slidably supported by the fixed plate and having openings therein to register with said pockets, means to hold said plate so that the holes therein are normally out of register with the pockets, and means to move the plate so that the holes therein are in register with the pockets.

27. In a bowling alley pin setting apparatus, a magazine for storing the pins comprising a fixed plate having holes therein arranged in the same relative positions as the pins when set on the alley, a wall surrounding each hole and forming pockets, a plate slidably supported by said fixed plate having openings therein in the same relative positions as the openings in the fixed plate, springs to hold the slidable plate so that the openings in the plates do not register, and mechanism to slide the plate so that the openings register.

28. In a bowling alley pin setting apparatus, a vertically movable plate provided with holes arranged in the position assumed by pins when set on the alley, cups pivotally secured to said frame adjacent to said holes to hold the pins, and automatic means to feed pins to the cups.

29. In a bowling alley pin setting apparatus, a vertically movable plate provided with holes arranged in the position assumed by pins when set on the alley, cups pivotally secured to said frame adjacent to said holes to hold the pins, and automatic means to fill the cups with pins simultaneously.

30. In a bowling alley pin setting apparatus, a vertically movable plate having openings therein in the position assumed by pins when set on the alley, cups secured to said plate, automatic means to feed pins to the cups, and automatic mechanism to lower the plate and dump the pins from said cups.

31. In a bowling alley pin setting apparatus, a vertically movable plate having openings therein in the position assumed by pins when set on the alley, cups to contain the pins pivotally mounted on the plate, automatic mechanism to elevate and lower the plate and to swing the cups to a horizontal and vertical position at the end of the respective movements of the plate, and mechanism connected with the cups to automatically fill them when swung to a horizontal position.

32. In a bowling alley pin setting apparatus, a vertically movable plate having openings therein in the position assumed by pins when set on the alley, vertical, semi-casings secured to said plate and partly surrounding said openings, arms pivotally secured to said plate, semi-casings secured to said arms corresponding to the shape of the first-mentioned semi-casings and forming cups to hold the pins, means to elevate and lower the plate and to simultaneously swing the cups to a horizontal and vertical position at the end of the respective movements of the plate, and mechanism connected with the cups to automatically fill them when swung to a horizontal position.

33. In a bowling alley pin setting apparatus, a storage magazine for holding a setting of pins having a slidable plate mounted thereon to normally hold the pins therein and openings to release the pins from the magazine when moved from a normal position, a vertically movable plate under said storage magazine and having openings therein in the position assumed by pins when set on the alley, cups to contain the pins and pivotally mounted on the plate, automatic mechanism to elevate and lower the plate and to swing the cups to a horizontal and vertical position at the end of the respective movements of the plate, and mechanism connected with the cups to slide the plate on the storage magazine when the vertically adjustable plate is in a raised position.

34. In a bowling alley pin setting apparatus, a storage magazine having pockets for holding a setting of pins, a slidable plate mounted thereon, said plate having holes therein to register at times with the pockets in the storage magazine, means to hold the plate so that the holes therein do not register with the pockets, a vertically movable plate under said storage magazine and having openings therein corresponding in position to the position of the pins when set up on the alley, cups to contain the pins and pivotally mounted on the plate, mechanism to elevate and lower the plate, and to swing the cups to a horizontal and vertical position at the end of the respective movements of the plate, and mechanism connected with the cups to slide the plate on the storage magazine when the cups are swung to a horizontal position in raising the plate to fill the cups.

35. In a bowling alley pin setting apparatus, a storage magazine having pockets for holding a setting of pins, a slidable plate mounted thereon, said plate having holes therein to register at times with the pockets in the storage magazine, means to hold the plate so that the holes therein do not register with the pockets, a projection on the plate, a vertically movable plate under said storage magazine and having openings therein corresponding in position to the position of the pins when set up on the alley, cups to contain the pins and pivotally mounted adjacent to the holes in the plate, mechanism to elevate and lower the plate and to simultaneously swing the cups to a horizontal and vertical position at the end of the respective movements of the plate, and a blade mounted to swing with the cups and having a slanting edge to engage the projection on the slidable plate to dump the pins in the storage magazine into the cups.

36. In a bowling alley pin setting apparatus, the pin setting apparatus comprising a vertically movable plate having the pin setting mechanism mounted thereon, said plate secured to rods slidably mounted in suitable supports, said rods formed with gear racks, a horizontal shaft having pinions keyed thereto and meshing with said racks, a drive shaft, and mechanism connecting the drive shaft and horizontal shaft to rotate the horizontal shaft first in one direction and then in another to lower and raise the vertically movable plate.

37. In a bowling alley pin setting apparatus, the pin setting apparatus comprising a vertically movable plate having the pin setting mechanism mounted thereon, said plate having rods secured thereto and slidably mounted in suitable supports, said rods formed with gear racks, a horizontal shaft having pinions keyed thereto and meshing with said racks, a drive shaft, a wheel suitably journaled and having a tooth projecting therefrom, a rock arm mounted adjacent to said wheel and having pawls secured thereto to engage said tooth, means geared to the drive shaft to continuously rock said arm, gearing connecting said wheel and the horizontal shaft, and means to hold the tooth from engagement by the pawls.

38. In a bowling alley pin setting apparatus, the pin setting apparatus comprising a vertically movable plate having the pin setting mechanism mounted thereon, said plate having rods secured thereto and slidably mounted in suitable supports, said rods formed with gear racks, a horizontal shaft having pinions keyed thereto and meshing with said racks, a drive shaft, a wheel suitably journaled and having a tooth projecting therefrom, a rock arm mounted adjacent to said wheel and having pawls secured thereto to engage said tooth, an arm geared to the drive shaft, a pitman connecting said arms, a rod slidably mounted adjacent to said wheel and having a tongue to cover the tooth thereon, a pin on said rod, a lug on the wheel to engage the pin, means to slide the rod to move the tongue from engagement with the tooth, and gearing connecting the wheel and horizontal shaft.

39. In a bowling alley pin setting apparatus, the setting apparatus comprising a plate with openings therein, semi-casings secured to the plate at said openings, other semi-casings pivotally mounted on the plate and adapted to swing into said openings, means to lower the plate when pins less than a complete set are standing on the alley and to swing the pivoted semi-casings so as to clamp the pins between the pivoted and secured semi-casings, means to raise the plate and the clamped pins, and means to clear the alley of dead wood.

40. In a bowling alley pin setting apparatus, the setting apparatus comprising a plate with openings therein, semi-casings secured to the plate at said openings, other semi-casings pivotally mounted on the plate and adapted to swing into said openings, means to lower the plate when pins less than a complete set are standing on the alley and to swing the pivoted semi-casings so as to clamp the pins between the pivoted and secured semi-casings, means to raise the plate and the clamped pins, and a sweep suitably mounted and operated to clear the alley of dead wood.

41. In a bowling alley pin setting apparatus, the setting apparatus comprising a plate with openings therein, semi-casings secured to the plate at said openings, other semi-casings pivotally mounted on the plate and adapted to swing into said openings, means to lower the plate when pins less than a complete set are standing on the alley and to swing the pivoted semi-casings so as to clamp the pins between the pivoted and secured semi-casings, means to raise the plate and the clamped pins, and a sweep to clear the alley of dead wood consisting of tubular rods pivotally secured, rods slidably mounted in said tubular rods, and a cross-rod connecting said rods.

42. In a bowling alley pin setting apparatus, a vertically movable plate having openings therein, semi-casings secured to the plate adjacent to said openings, other semi-casings pivotally secured to the plate, said pivoted semi-casings secured together for simultaneous operation, a rod operatively connected with said pivoted semi-casings, and means to clamp said rod so that when the plate is moved, the pivoted semi-casings are swung to a vertical or a horizontal position or swung at a slight angle to the horizontal and return.

43. In a bowling alley pin setting apparatus, a vertically movable plate having openings therein, semi-casings secured to the plate adjacent to said openings, other semi-casings pivotally secured to the plate, said pivoted semi-casings secured together for simultaneous operation, a rod operatively connected with said pivoted semi-casings, said rod provided with notches, and means to engage said notches and hold the rod from movement so as to swing the pivoted semi-casings from a horizontal to a vertical position and return, or to a slight angle to the horizontal and return.

44. In a bowling alley pin setting apparatus, a vertically movable plate having openings therein, semi-casings secured to the plate adjacent to said openings, other semi-casings pivotally secured to the plate, said pivoted semi-casings secured together for simultaneous operation, a rod operatively connected with said pivoted semi-casings, said rod provided with notches, a trigger comprising a plate provided with a slot to engage said rod, and means to adjust said trigger to engage said notches and hold the rod when the plate is adjusted so as to swing the pivoted semi-casings from a horizontal to a vertical position and return, or to a slight angle to the horizontal and return.

45. In a bowling alley pin setting apparatus, a vertically movable plate having openings therein, semi-casings secured to the plate adjacent to said openings, other semi-casings pivotally secured to the plate, said pivoted semi-casings secured together for simultaneous operation, a rod operatively connected with said pivoted semi-casings, said rod provided with notches, a trigger comprising a plate pivotally secured and provided with a curved slot to engage the rod, and means to adjust said trigger to engage said notches and hold the rod when the plate is adjusted so as to swing the pivoted semi-casings from a horizontal to a vertical position and return, or to a slight angle to the horizontal and return.

46. In a bowling alley pin setting apparatus, a vertically movable plate having openings therein, semi-casings secured to the plate adjacent to said openings, other semi-casings pivotally secured to the plate, said pivoted semi-casings secured together for simultaneous operation, a rod operatively connected with said pivoted semi-casings, said rod provided with notches, a trigger comprising a plate pivotally secured and provided with a curved slot to engage the rod, a spring actuated clamp secured to said plate, and means to adjust said plate to engage the notches in the rod so as to hold it when the plate is adjusted and swing the pivoted semi-casings from a horizontal to a vertical position and return or to a slight angle to the horizontal and return.

47. In a bowling alley pin setting apparatus, a dead wood sweep comprising a frame pivotally mounted, a lever connected with said sweep, a gear wheel suitably journaled, a pitman connecting said lever and gear wheel, a wheel suitably journaled and having a gear face meshing with said gear wheel, a tooth extending from said wheel, a rock arm mounted adjacent to the wheel, pawls mounted on said arm and engaging the tooth aforesaid, and means to rock the arm.

48. In a bowling alley pin setting apparatus, a dead wood sweep comprising a frame pivotally mounted, a lever connected with said sweep, a gear wheel suitably journaled, a pitman connecting said lever and gear wheel, a wheel suitably journaled and having a gear face meshing with said gear wheel, a tooth extending from said wheel, a rock arm mounted adjacent to the wheel, pawls mounted on said arm and engaging the tooth aforesaid, means to rock the arm, a rod slidably mounted adjacent to the wheel and having a tongue that engages the tooth when in its normal position and holds the pawls from engaging the tooth, means to slide the rod and tongue from engagement with the tooth, and means operated by the wheel to return the rod to its normal position.

49. In a bowling alley pin setting apparatus, a dead wood sweep comprising a frame pivotally mounted, a lever connected with said sweep, a gear wheel suitably journaled, a pitman connecting said lever and gear wheel, a wheel suitably journaled and having a gear face meshing with said gear wheel, a tooth extending from said wheel, a rock arm mounted adjacent to the wheel, pawls mounted on said arm and engaging the tooth aforesaid, means to rock the arm, a rod slidably mounted adjacent to the wheel and having a tongue that engages the tooth when in its normal position and holds the pawls from engaging the tooth, means to slide the rod and tongue from engagement with the tooth, a pin on the rod, and a lug on the wheel to engage the pin and return the rod to its normal position.

50. In a bowling alley pin setting apparatus, in combination with an alley having a pit at its rear and a ball rack, an elevator located adjacent to said pit, mechanism to deliver the pins and balls to the elevator, a trough to carry the balls from the elevator to the ball rack, a pin separator at the delivery end of the elevator, a conveyer to carry the pins from the separator, an assembling magazine at the delivery end of the conveyer, a storage magazine arranged below the assmbling magazine, means to automatically dump the contents of the assembling magazine when full into the storage magazine, a setting magazine having a plurality of cups pivotally secured thereto, and means to automatically dump the contents of the storage magazine into the cups when empty.

51. In a bowling alley pin setting apparatus, in combination with an alley having a pit at its rear, and a ball rack, an elevator located adjacent to said pit, mechanism to deliver the pins and balls to the elevator, a trough to carry the balls from the elevator to the ball rack, a pin separator at the delivery end of the elevator comprising a cylindrical casing, a wheel mounted in said casing having blades secured thereto forming cups with the interior of the casing to carry a single pin at a time, a conveyer to carry the pins from the separator, an assembling magazine at the delivery end of the conveyer, a storage magazine arranged below the assembling magazine, means to automatically dump the contents of the assembling magazine when full into the storage magazine, a setting magazine having a plurality of cups pivotally secured thereto, and means to automatically dump the contents of the storage magazine into the cups when empty.

52. In a bowling alley pin setting apparatus, in combination with an alley having a pit at its rear, and a ball rack, an endless belt conveyer in the bottom of the pit, an elevator at the delivery end of said conveyer, a trough at the delivery end of the elevator to return the balls to the ball rack, a pin separator at the delivery end of the elevator, a conveyer to carry the pins from the separator, an assembling magazine at the delivery end of the conveyer, a storage magazine arranged below the assembling magazine, means to automatically dump the contents of the assembling magazine when full into the storage magazine, a setting magazine having a plurality of cups pivotally secured thereto, and means to automatically dump the contents of the storage magazine into the cups when empty.

53. In a bowling alley pin setting apparatus, in combination with an alley having a pit at its rear, an elevator located adjacent to the pit, mechanism to deliver the pins to the elevator, a pin separator at the delivery end of the elevator, a conveyer at the delivery end of the separator, mechanism to deliver the pins to said conveyer in a uniform position, an assembling magazine located at the delivery end of the conveyer comprising a rotatable structure, pin compartments secured to said structure, step by step mechanism to successively fill said compartments, a storage magazine located under the assembling magazine, means to automatically dump the contents of the assembling magazine into the storage magazine when all of the compartments are filled, a setting magazine under the storage magazine, and mechanism to automatically dump the contents of the storage magazine into the setting magazine when empty.

54. In a bowling alley pin setting apparatus, in combination with an alley having a pit at its rear, an elevator located adjacent to the pit, mechanism to deliver the pins to the elevator, a pin separator at the delivery end of the elevator, a conveyer at the delivery end of the separator, mechanism to deliver the pins to said conveyer in a uniform position, an assembling magazine located at the delivery end of the conveyer and arranged to hold a full set of pins, a storage magazine located under the assembling magazine comprising a stationary plate having pockets, and a perforated plate slidably mounted on said stationary plate, means to hold said slidable plate so that the holes therein do not register with the pockets, automatic means to dump the contents of the assembling magazine when full into the storage magazine, the setting magazine located under the storage magazine, and mechanism carried by the setting magazine to move the slidable plate of the storage magazine so that the holes therein register with the storage pockets to dump their contents into the setting magazine when empty.

55. In a bowling alley pin setting apparatus, in combination with an alley having a pit at its rear, an elevator located adjacent to the pit, mechanism to deliver the pins to the elevator, a pin separator at the delivery end of the elevator, a conveyer at the delivery end of the separator, mechanism to deliver the pins to said conveyer in a uniform position, an assembling magazine located at the delivery end of the conveyer and arranged to hold a full set of pins, a storage magazine located under the assembling magazine, means to automatically dump the contents of the assembling magazine when full into the storage magazine, a setting magazine under the storage magazine consisting of a vertically adjustable plate having holes therein in the relative position of pins when set on the alley, cups pivotally mounted on said plate to swing from a horizontal to a vertical position, mechanism to swing the cups to a vertical position to dump the contents of the cups when the plate is lowered, and to swing them to a horizontal position when the plate is elevated, and mechanism connected with said cups to dump the contents of the storage magazine when the plate is raised after emptying the cups.

56. In a bowling alley pin setting apparatus, in combination with an alley having a pit at its rear, an elevator located adjacent to the pit mechanism to deliver the pins to the elevator, a pin separator at the delivery end of the elevator, a conveyer at the delivery end of the separator, mechanism to deliver the pins to said conveyer in a uniform position, an assembling magazine located at the delivery end of the conveyer and arranged to hold a full set of pins, a storage magazine located under the assembling magazine and having pockets to contain a full set of pins, mechanism to dump the assembling magazine automatically when full into the storage magazine, a plate slidably mounted on the storage magazine having a plurality of holes therein corresponding to the pockets aforesaid, means to hold the plate so that the holes therein are out of alinement with said pockets, a setting magazine under the storage magazine consisting of a vertically adjustable plate having holes therein in the relative position of pins when set on the alley, cups pivotally mounted on said plate to swing from a horizontal to a vertical position, mechanism to swing the cups to a vertical position to dump the contents of the cups when the plate is lowered and to swing them to a horizontal position when the plate is elevated, and mechanism connected with said cups to slide the plate in the storage magazine so that the holes therein register with the pockets to dump the pins therein into the cups.

57. In a bowling alley pin setting apparatus, in combination with an alley having a pit at its rear, an elevator located adjacent to the pit, mechanism to deliver the pins to the elevator, a pin separator at the delivery end of the elevator, a conveyer at the delivery end of the separator, mechanism to deliver the pins to said conveyer in a uniform position, an assembling magazine located at the delivery end of the conveyer and arranged to hold a full set of pins, a storage magazine located under the assembling magazine and having pockets to contain a full set of pins, mechanism to dump the assembling magazine automatically when full into the storage magazine, a plate slidably mounted on the storage magazine having a plurailty of holes therein corresponding to the pockets aforesaid, means to hold the plate so that the holes therein are out of alinement with said pockets, a projection on the plate, a setting magazine under the storage magazine having a plurality of cups to hold a set of pins, and a blade secured to the setting magazine to engage the projection on the plate and slide it so as to dump the contents of the pockets into the cups when empty.

58. In a bowling alley pin setting apparatus, in combination with an alley having a pit at its rear, an elevator located adjacent to the pit, mechanism to deliver the pins to the elevator, a pin separator at the delivery end of the elevator, a conveyer at the delivery end of the separator, mechanism to deliver the pins to said conveyer in a uniform position, an assembling magazine located at the delivery end of the conveyer and arranged to hold a full set of pins, a storage magazine located under the assembling magazine and having pockets to contain a full set of pins, mechanism to dump the assembling magazine automatically when full into the storage magazine, a plate slidably mounted on the storage magazine having a plurality of holes therein corresponding to the pockets aforesaid, means to hold the plate so that the holes therein are out of alinement with said pockets, a projection on the plate, a setting magazine under the storage magazine consisting of a vertically movable plate having a series of holes therein, cups to hold a set of pins pivotally mounted on the plate and constructed to enter the holes therein, cross rods and links connecting said cups together for simultaneous operation, and a blade secured to one of said rods and engaging the projection on the plate when the cups are empty and assume a horizontal position to dump the contents of the pockets into them.

59. In a bowling alley pin setting apparatus, in combination with an alley having a pit at its rear, an elevator located adjacent to the pit, mechanism to deliver the pins to the elevator, a pin separator at the delivery end of the elevator, a conveyer at the delivery end of the separator, mechanism to deliver the pins to said conveyer in a uniform position, an assembling magazine consisting of a rotatable structure having a plurality of compartments to hold a full set of pins, spouts emptying into said compartments and arranged to receive the pins from the conveyer aforesaid, a frame slidably mounted on said structure and having plates secured thereto to close said compartments, means to slide said frame when the magazine is full to dump the contents of the compartments, a storage magazine under the assembling magazine having a plurality of pockets to receive and hold the pins from said assembling magazine, a setting magazine under the storage magazine and having a plurality of cups to hold a full set of pins, and means to dump the contents of the storage magazine into the cups when empty.

60. In a bowling alley pin setting apparatus, in combination with an alley having a pit at its rear, a conveyer in said pit, an elevator located at the delivery end of the conveyer, a pin separator at the delivery end of the elevator consisting of a cylindrical casing, a wheel journaled in said casing having a plurality of blades secured thereto constructed to deliver the pins in a horizontal position, a spout at the delivery end of the separator having a partition midway of the width of the separator to engage the middle of the pins and present them butt foremost, a conveyer to receive the pins from the spout, an assembling magazine located at the delivery end of the conveyer and arranged to hold a full set of pins, a storage magazine located under the assembling magazine and having pockets to contain a full set of pins, mechanism to dump the assembling magazine automatically when full into the storage magazine, a plate slidably mounted on the storage magazine having a plurality of holes therein corresponding to the pockets aforesaid, means to hold the plate so that the holes therein are out of alinement with said pockets, a projection on the plate, a setting magazine under the storage magazine having a plurality of cups to hold a set of pins, means to tilt said cups simultaneously to dump the pins and return them to a horizontal position, and a blade connected with said cups to engage the projection on the plate to dump the contents of the pockets into the cups when empty.

61. In a bowling alley pin setting apparatus, in combination with an alley having a pit at its rear, a conveyer in said pit, an elevator located at the delivery end of the conveyer, a pin separator at the delivery end of the elevator consisting of a cylindrical casing, a wheel journaled in said casing having a plurality of blades secured thereto constructed to deliver the pins in a horizontal position, a spout at the delivery end of the separator having a partition midway of the width of the separator to engage the middle of the pins and present them butt foremost, a conveyer to receive the pins from the spout, an assembling magazine consisting of a rotatable structure having a plurality of compartments to hold a full set of pins, spouts emptying into said compartments and arranged to receive the pins from the conveyer aforesaid, a frame slidably mounted on said structure and having plates secured thereto to close said compartments, means to slide said frame when the magazine is full to dump the contents of the compartments, a storage magazine under the assembling magazine consisting of a stationary plate having a plurality of pockets to receive and hold the pins from said assembling magazine, a perforated plate slidably mounted on said stationary plate, springs to hold said slidable plate so that the holes therein do not register with the pockets, a projection on said slidable plate, a setting magazine under the storage magazine consisting of a vertically movable plate having holes therein arranged in the positions assumed by pins when set on the alley, a plurality of cups pivotally mounted on said plate to hold a set of pins, mechanism to lower the plate and swing said cups into said holes to set the pins and return the cups to a horizontal position when the plate is raised, and a blade secured to said cups to engage the projection on the sliding plate to open the pockets in the assembling magazine and deliver the contents to the cups when empty.

62. In a pin setting machine for a bowling alley, the combination of a vertically movable pin setter comprising means for receiving pins in horizontal position, means for removing all of the pins from the alley bed, means for lowering the setter to set the pins on the alley bed, and means for raising the pin receiving means to upright position to permit the pins to pass through the setter into position upon the alley bed.

63. In a pin setting machine for a bowling alley, the combination of a vertically movable pin setter comprising means for supporting a set of pins in horizontal position, means for removing all of the pins from the alley bed prior to the movement of said setter, and means operable by the movement of the setter for righting said supporting means at the lowermost point in the travel of the setter, whereby the pins are raised to upright position and positioned upon the alley bed.

64. In a pin setting machine for a bowling alley, the combination of means for setting the pins, including means adapted to receive and hold pins in horizontal position, and means for conveying the pins from the alley bed to the setting means, said conveying means comprising an endless carrier adapted to lift the pins and a single inclined chute located adjacent the limit of the upward travel of the carrier for receiving pins elevated by the carrier.

65. In a pin setting machine for a bowling alley, the combination of means for setting pins, including means adapted to receive and hold pins in horizontal position, and means for conveying the pins from the alley pit to the said means, said conveying means comprising a casing, a single inclined chute at the top of the casing, means for elevating the pins singly to the chute, and means for causing the pins to slide down the chute with their butt ends foremost.

66. In a pin setting machine for a bowling alley, the combination of means for setting the pins, including means adapted to receive and hold pins in horizontal position, and means for conveying the pins from the alley pit to the setting means, said conveying means comprising a casing, an endless carrier including members having inclined faces traveling adjacent the casing and adapted to elevate the pins in contact with the casing, a single inclined chute, the upper end of the casing being arranged with respect to the travel of the carrier to permit the pins to roll into and slide down the chute, and means in said chute to cause the pins to be delivered therefrom with their butt ends foremost.

67. In a pin setting machine for a bowling alley, the combination of a pin setter, including means adapted to receive and hold pins in horizontal position, means normally disposed above the plane of the tops of the pins on the alley bed and adapted to move always in a direction parallel to the alley bed for clearing the alley preparatory to the action of said setter, and means for bringing the setter into operation during the movement of the clearing means.

68. In a pin setting machine for a bowling alley, the combination of a sweeper normally disposed above the plane of the tops of the pins on the alley bed and movable always in a direction parallel to the alley to clear the alley bed, a pin setter adapted to place a set of pins in position upon the alley bed, and means for moving said sweeper rearwardly over the alley bed and back to normal position and for moving said setter in a position adjacent to the alley bed and depositing a set of pins, said means causing the setter to move into position adjacent the alley bed while the sweeper is returning to normal position after clearing the alley.

69. In a pin setting machine for a bowling alley, the combination of a sweeper normally disposed above the plane of the tops of the pins on the alley bed and movable always in a direction parallel to the alley to clear the alley bed, and a pin setter, including means adapted to receive and hold pins in horizontal position above the alley bed and having a movement into position to deposit the pins and a return movement, the movement of the setter into position to deposit the pins occurring during the return movement of the sweeper.

70. In a pin setting machine for a bowling alley, the combination of a storage magazine adapted to support a set of pins, and rotatable means for delivering pins to said magazine.

71. In a pin setting machine for a bowling alley, the combination of a storage magazine, a vertical shaft about said magazine, and means rotatably mounted thereon for delivering pins to said magazine.

72. In a pin setting machine for a bowling alley, the combination of a pin setter, a storage magazine adapted to support a set of pins, rotatable means for delivering pins to said magazine and conveying means for elevating the pins from the alley bed and depositing them in said rotatable means.

73. In a pin setting machine for a bowling alley, the combination of a pin setter, a storage magazine, a vertical shaft, means rotatable about said shaft and adapted to deliver pins to said magazine, and means for depositing pins in said rotatable means.

74. In a pin setting machine for a bowling alley, the combination of a pin setting mechanism, rotatable means mounted above said mechanism and adapted to deliver pins thereto, and a conveyer for depositing pins in said rotatable means.

75. In a pin setting machine for a bowling alley, the combination of a pin setter, a storage magazine, rotatable means for distributing pins to said storage magazine, means for receiving the pins and delivering them to said rotatable means, and a sweeper for removing pins from the alley.

76. In a pin setting machine for a bowling alley, the combination of a pin setter, a storage magazine, a vertical shaft above said magazine, means rotatably mounted on said shaft for distributing pins to said magazine, a conveyer for delivering pins to said distributing means, a sweeper, and actuating means therefor, whereby the alley is cleared of pins.

77. In a pin setting machine for a bowling alley, the combination of a frame having means thereon adapted to grip pins standing on the alley bed, and means for actuating said frame to lift the standing pins from the alley bed.

78. In a pin setting machine for a bowling alley, the combination of a frame having means thereon adapted to grip the heads of bowling pins, means for actuating said frame to lift the standing pins, a sweeper, and actuating means therefor for removing the deadwood from the alley bed.

79. In a pin setting machine for a bowling alley, the combination of a frame having means thereon to engage and grip the pins standing on the alley bed, means for actuating said frame to lift the standing pins, and means for removing the deadwood from the alley bed.

ERNEST HEDENSKOOG.

Witnesses:
 WM. O. BELT,
 M. A. KIDDIE.